United States Patent [19]

Lange et al.

[11] Patent Number: 5,705,557
[45] Date of Patent: Jan. 6, 1998

[54] ONE-COMPONENT AQUEOUS COATING SYSTEMS CONTAINING A REACTIVE ADDITIVE COMPONENT

[75] Inventors: Hartwig Lange, Haltern; Martina Ortelt, Marl, both of Germany

[73] Assignee: Huels Aktiengesellschaft, Marl, Germany

[21] Appl. No.: 568,816

[22] Filed: Dec. 7, 1995

Related U.S. Application Data

[62] Division of Ser. No. 437,798, May 9, 1995.

[30] Foreign Application Priority Data

Jul. 9, 1994 [DE] Germany ............... 44 24 277.8

[51] Int. Cl.$^6$ ................ C08J 3/00; C08K 3/20; C08L 75/00; C08F 8/30
[52] U.S. Cl. .............. 524/507; 524/591; 524/839; 524/840; 525/123; 525/455
[58] Field of Search ........................ 524/507, 591, 524/839, 840; 525/123, 455

[56] References Cited

U.S. PATENT DOCUMENTS 4,103,050   7/1978   Laskin et al. ................... 427/379
4,419,407  12/1983   Picirrilli et al. .................. 428/423.1

OTHER PUBLICATIONS

Odian, George, Principles of Polymerization, 2nd ed., 1981, pp. 20–25.

*Primary Examiner*—Patrick Niland
*Attorney, Agent, or Firm*—Oblon, Spivak, McClelland, Maier & Neustadt, P.C.

[57] ABSTRACT

A one-component aqueous coating system comprising (A) a hydrophilic polyacrylate polyol or polyesterpolyol containing at least one hydroxyl group, (B) a polyisocyanate which is water resistant at room temperature or a blocked polyisocyanate, (C) optionally a pigment or a conventional paint auxiliary, such as an antifoam, a levelling agent, a catalyst or a thixotropic agent, and a further reactive additive component (D), in a quantity of from 2 to 20% by weight, based on the overall solids content of (A), (B) and (D), the additive component (D) being characterized in that it contains at least one reactive OH, NH, $NH_2$ or SH group and has a functionality of at least 1.5 to 3.0 relative to the crosslinking agent (B), a solubility in water of below 2% by weight and a molecular weight of 500–2000 g/mol.

8 Claims, No Drawings

ONE-COMPONENT AQUEOUS COATING SYSTEMS CONTAINING A REACTIVE ADDITIVE COMPONENT

This is a Division of application Ser. No. 08/437,798 filed on May 9, 1995 now pending.

BACKGROUND OF THE INVENTION

1. Field of the Invention

The invention relates to a one-component aqueous coating system which contains an additional reactive additive component, and to the use of such a coating system for the preparation of a clear and pigmented coating material.

2. Discussion of the Background

Aqueous coating systems normally require a certain quantity of organic solvents in order to ensure good film formation at room temperature (RT) and to give high-gloss coatings.

Solvents which can be used for this purpose, which are often termed coalescing aids are low molecular weight glycols, glycol ethers and glycol ether acetates conventional in the prior art (Geel, Journal of the Oil & Colour Chemists' Association 1993 (2) 76–81; Alahapperuma and Glass, Journal of Coatings Technology 63, 799 (1991) 69–78).

A disadvantage of this kind of coalescing aids of the prior art is that after film formation has taken place and depending on their volatility and the curing conditions, these film-forming auxiliaries evaporate from the coating, rapidly or over a prolonged period, and thus present the problem of polluting emission from the aqueous systems which are formulated for environmental compatibility. Solvents which escape slowly may have the additional disadvantage of leaving the coating susceptible to moisture (Storfer and Yuhas, Coating 1 (1988) pp. 2–7).

Attempts to eliminate these disadvantages which are inherent in evaporating solvents have been made by Blank (Journal of Coatings Technology 49, 631 (1977) pp. 46–59 and 60, 764 (1988) pp. 43–50 and 61, 777 (1989) pp. 119–128) and by Shain (Modern Paint and Coatings June 1993, pp. 32–38). Blank and Shain have synthesized specifically water-soluble low molecular weight compounds (including a bisphenol A/ethylene oxide adduct and polyurethane oligomers) which react by way of their functional hydroxyl groups with certain crosslinking resins such as urea/formaldehyde, melamine/formaldehyde, benzoguanine/formaldehyde, and are therefore unable to escape from the coating. The reactive diluents preferred by Blank are strongly hydrophilic, preferably water-soluble oligomers such as, for example, the adduct of bisphenol A with 6 mol of ethylene oxide. According to Blank, however, a disadvantage of this system is the limited resistance of the compounds which remain in the coating in the case of exterior applications. This disadvantageous, poor weather resistance, is attributed by Shain to the known degradation of polyethylene ethers and polypropylene ethers under ultraviolet radiation, to which coatings are exposed under outdoors sunlight conditions.

According to Blank, in the systems prepared and investigated by him, both commercially available polypropylene glycol (PPG 400) and polytetramethylene glycol (PTMG 600), in combination with the formaldehyde-containing crosslinking resins used, have very poor properties, such as poor adhesion, poor water resistance, poor results in the salt spray test and a low degree of hardness, and can, therefore, be used only in a small proportion of the total coating composition.

Only specially prepared, low molecular weight, water-soluble polyurethanediols were found by Blank and Shain to be generally suitable as reactive auxiliary solvents which also have a good resistance in ultraviolet light. These low molecular weight polyurethanes, however, are not prepared on a large industrial scale, but represent specialty chemicals whose widespread use as reactive auxiliary solvents, for example as a replacement for evaporating glycols or glycol ethers, is not economically advantageous. The low molecular weight polyurethanes, therefore, do not represent an economically acceptable alternative to evaporating auxiliary solvents.

According to EP-A-0 542 085, aqueous two-component polyurethane systems are admixed with nonvolatile, water-soluble polyetherpolyols which, with the aid of the isocyanate crosslinking agents, are incorporated into the coating and thus do not escape into the environment. Water-soluble polyetherpolyols are obtained by ethoxylation or propoxylation of alcoholic compounds (cf. Examples EP-A-0 542 085). Glycol ethers obtained by ethoxylation or propoxylation may indeed be water-soluble, but have the great disadvantage that they do not possess adequate stability to incident UV radiation which affects coatings in outdoor environments. Water-soluble polyethylene glycols and polypropylene glycols are therefore unsuitable as additives for high-quality coating materials which are also used in outdoor applications.

SUMMARY OF THE INVENTION

Accordingly, the object of this invention is to eliminate the disadvantages of the coating systems described in the prior art. This object is achieved by a one-component aqueous coating system based on (A) a hydrophilic polymer containing at least one hydroxyl group, (B) a crosslinking agent consisting of a polyisocyanate, water-resistant, at room temperature, or a blocked polyisocyanate or a melamine resin, and (C) optionally a pigment or a conventional paint auxiliary, such as an antifoam, a levelling agent, a catalyst or a thixotropic agent, and (D) a reactive additive component, in an amount of from 2 to 20% by weight, based on the overall solids content of (A), (B) and (D), the additive component (D) being characterized in that it contains reactive OH, NH, $NH_2$ and/or SH groups and has a functionality of at least 1.5 relative to the crosslinking agent (B), a solubility in water of below 2% by weight and a molar weight of 500–2000 g/mol.

The aqueous coating system according to the invention is obtainable by mixing components (A), (B) and optionally (C) and the further reactive additive component (D), in a quantity of from 2 to 20% by weight, based on the overall solids content of (A), (B) and (D), if desired, in an organic auxiliary solvent, and subsequently converting this mixture to an aqueous system. The resulting aqueous system may be present in the form of a suspension, dispersion, emulsion or solution.

The compound employed as additive component (D) is linear or has a low degree of branching, and contains at least one group which is reactive with isocyanate, and in addition possesses more than one, on average at least 1.5, "active hydrogen atoms", i.e. hydrogen atoms which are reactive in accordance with the Zerewitinoff test. The term "active hydrogen atoms" is employed to mean hydrogen atoms which are attached to oxygen, sulphur or nitrogen.

Examples of such a compound is a polyol such as polyetherpolyol, polyesterpolyol, polylactonepolyol, polyacetalpolyol, polyesteramidepolyol, polycarbonatepolyol, polyolefinpolyol, an acrylic ester copolymer which contains at least one hydroxyl group, polythioetherpolyol, polythioetheresterpolyol, and polythiol and a polyamine containing at least one primary and/or secondary amine group. More than one of these compounds may likewise be present in the reactive additive component (D) as a mixture.

The reactive additive component (D) both reduces the minimum film-forming temperature (DIN 53 787) of the coating according to the invention and improves the pigmentability of the aqueous system, so that, with the aid of the further reactive additive component (D), it is possible to obtain a high-gloss pigmented coating.

The technical advantage of the present invention resides in the fact that the reactive additive component (D), added in accordance with the invention, is incorporated almost completely into the final film and does not evaporate into the environment during or after baking. Comparable aqueous systems according to the prior art comprising (A), (B) and optionally (C), without the addition of the reactive additive component (D), do not result in coating materials which, after drying, produce uniform, defect-free, glossy surfaces. Even at subsequent curing temperatures of between 120° and 180° C., it was not possible to obtain any acceptable coating films with the above-mentioned coatings without the component (D).

In contrast, the aqueous system according to the present invention, comprising (A), (B) and optionally (C) and with the addition of 2–20% by weight of a reactive additive component (D), based on the overall solids content of (A), (B) and (D), after evaporation of the water and drying the coating at room temperature, results in both a clear or a white-pigmented coating which is defect-free, crack-free and of high gloss. During the curing operation, by baking at a sufficiently high temperature, the reactive additive component (D) is gradually and very substantially incorporated firmly into the film. The component (D), therefore, does not escape into the environment under suitable crosslinking conditions, in contrast to the volatile film-forming assistants of the prior art. Rather, component (D) is bound in by chemical reaction with the crosslinking agent (B). The reactive additive component (D) usually possesses a functionality in the range 1.5–3.0, but preferably a functionality of 2.0, for the chemical reaction of the crosslinking agent given under (B). Furthermore, as reactive component (D) is used preferably polytetramethylene glycol having an average molecular weight of 500–2000 g/mol, more preferably 500–1200 g/mol.

Prior to the curing operation, the reactive additive component (D) added in accordance with the invention remains unattached in dissolved, emulsified, dispersed or suspended form, and is only linked together with the polymer (A) at the curing stage, by way of the crosslinking agents (B).

German patents DE 36 41 494, and DE 38 31 169 refer to a chemical binding of a reactive additive component (D) to the polymer (A) prior to the curing reaction with the crosslinking agents (B). The approach of these references is clearly distanced from the present invention which requires that polymer (A), crosslinking agent (B) and the reactive additive component (D) are all present in dissolved, emulsified, dispersed or suspended form without chemical attachment to one another until the time of crosslinking, which takes place during or after evaporation of the water.

The aqueous coating system according to the invention is prepared by mixing components (A)–(D) preferably in an organic solvent. Subsequently this mixture is converted into an aqueous coating system according to the invention by addition of water and removal of the solvent. The aqueous coating system may then be present in the form of an aqueous suspension, dispersion, emulsion or solution.

DESCRIPTION OF THE PREFERRED EMBODIMENTS

Having generally described this invention, a further understanding can be obtained by reference to certain specific examples which are provided herein for purposes of illustration only and are not intended to be limiting unless otherwise specified.

EXAMPLE 1

(A) 500 g of a polyester having an acid number of 19 mg of KOH/g and a hydroxyl number of 36 mg of KOH/g, synthesized from isophthalic acid, hexahydrophthalic acid, trimellitic anhydride, neopentylglycol and hexane-1,6-diol, (D) as reactive additive component (D), 27.5 g of polytetramethylene glycol having a hydroxyl number of 171 mg of KOH/g (TERATHANE® 650 from Du Pont) and (B) 161 g of a blocked polyisocyanate prepared by a process described in DE 27 32 662 from the trimer of isophorone diisocyanate by blocking with methyl ethyl ketoxime, and 15 g of dimethylaminoethanol, are dissolved together in 661 g of acetone, and then 1664.8 g of (deionized) water are added with stirring. The aqueous system which is formed is freed from acetone on a rotary evaporator and concentrated until a solids content of 40% by mass is reached.

The dispersion obtained has a minimum, film-forming temperature (according to DIN 53 787) of 17° C. and, after drying at room temperature (RT), gives both clear and pigmented coatings of high gloss which cure in 15 minutes at 160° C. to give high quality gloss polyurethane (PUR) coatings.

EXAMPLE 2

(B) 160.85 g of a 65% solution in methyl ethyl ketone of a blocked polyisocyanate obtainable by a process described in DE 27 32 662 from the trimer of isophorone diisocyanate by blocking with methyl ethyl ketoxime, and, as reactive additive component (D), 16.6 g of polytetramethylene glycol having a hydroxyl number of 171 mg of KOH/g (TERATHANE® 650 from Du Pont) and 11.0 g of dimethylaminoethanol are added to and dissolved in (A) 450 g of a 54.7% polyacrylate solution in methyl ethyl ketone, which has been prepared by polymerization of methyl methacrylate, n-butyl acrylate, hydroxyethyl acrylate and acrylic acid, and the solid resin component of which has an acid number of 40 mg of KOH/g and a hydroxyl number of 53 mg of KOH/g.

Subsequently, 745.7 g of deionized water are added with stirring. The methyl ethyl ketone is removed on a rotary evaporator, and the dispersion is concentrated until a solids content of 37.8% by mass is reached. The dispersion obtained has a minimum film-forming temperature (according to DIN 53 787) of 8° C. and gives both clear and white-pigmented coatings of high gloss which crosslink within 30 minutes at 180° C. to give solvent- and water-resistant films.

EXAMPLE 3

(A) 325 g of a polyester having an acid number of 19 mg of KOH/g and a hydroxyl number of 36 mg of KOH/g, synthesized from isophthalic acid, terephthalic acid, trimellitic anhydride, neopentylglycol, hexane-1,6-diol and ethylene glycol, (D) as reactive additive component (D), 22 g of polytetramethylene glycol having a hydroxyl number of 171 mg of KOH/g (TERATHANE® 650 from Du Pont) and (B) 102 g of a blocked polyisocyanate prepared by a process described in DE 27 32 662 from the trimer of isophorone diisocyanate by blocking with methyl ethyl ketoxime, and 9.8 g of dimethylaminoethanol, are dissolved together in 230 g of acetone, and then 825 g of (deionized) water are added with stirring. The aqueous system which is formed is freed from acetone on a rotary evaporator and concentrated until a solids content of 39% by mass is reached.

The dispersion obtained has a minimum film-forming temperature (according to DIN 53 787) of 19° C. and, after drying at RT, gives both clear and pigmented coatings of high gloss which cure in 15 minutes at 160° C. to give high-quality gloss PUR coatings.

Comparative Example 1

(A) 350 g of the polyester from Example 1 having an acid number of 19 mg of KOH/g and a hydroxyl number of 36 mg of KOH/g, synthesized from isophthalic acid, hexahydrophthalic acid, trimellitic anhydride, neopentylglycol and hexane-1,6-diol, and (B) 83 g of a blocked polyisocyanate prepared by a process described in DE 27 32 662 from the trimer of isophorone diisocyanate by blocking with methyl ethyl ketoxime, and 10.55 g of dimethylaminoethanol, are dissolved together in 433 g of acetone, and then 823 g of (deionized) water are added with stirring. The aqueous system formed is freed from acetone on a rotary evaporator and concentrated until a solids content of 43% by mass is reached. The dispersion obtained has a minimum film-forming temperature (according to DIN 53 787) of 25° C. and, after drying at RT, produces, rather than coherent films, coatings which contain cracks and which, as a clear coat or as a pigmented white coating material, form dull, matt surfaces. They cannot be cured to give coatings having acceptable surfaces.

Comparative Example II

B) 85.95 g of blocked polyisocyanate obtainable by a process described in DE 27 32 662 from the trimer of isophorone diisocyanate by blocking with methyl ethyl ketoxime and 11.0 g of dimethylaminoethanol are dissolved in (A) 450 g of a 54.7% polyacrylate solution in methyl ethyl ketone, from Example 2, which has been prepared by polymerization of methyl methacrylate, n-butyl acrylate, hydroxyethyl acrylate and acrylic acid, and whose solid resin component has an acid number of 40 mg of KOH/g and a hydroxyl number of 53 mg of KOH/g.

Then 674.3 g of deionized water are added with stirring. The methyl ethyl ketone is removed on a rotary evaporator, and the dispersion is concentrated until a solids content of 37.7% by mass is reached. The dispersion obtained has a minimum film-forming temperature (according to DIN 53 787) of 28° C. and, after drying at RT, produces, rather than coherent films, coatings which contain cracks and which, as a clear coat and as a white-pigmented coating material, form dull, matt surfaces. They cannot be cured to give coatings having acceptable surfaces.

Comparative Example III (A) 325 g of the polyester from Example 3 having an acid number of 19 mg of KOH/g and a hydroxyl number of 36 mg of KOH/g, synthesized from isophthalic acid, terephthalic acid, trimellitic anhydride, neopentylglycol, hexane-1,6-diol and ethylene glycol, and (B) 77 g of blocked polyisocyanate, prepared by a process described in DE 27 32 662 from the trimer of isophorone diisocyanate by blocking with methyl ethyl ketoxime, and 9.8 g of dimethylaminoethanol, are dissolved together in 217 g of acetone, and then 747 g of (deionized) water are added with stirring. The aqueous system formed is freed from acetone on a rotary evaporator and is concentrated until a solids content of 40% by mass is reached. The dispersion obtained has a minimum film-forming temperature (according to DIN 53 787) of 26° C. and, after drying at room temperature, produces, rather than coherent films, coatings which contain cracks and which, as a clear coat and as a pigmented white coating material, form dull, matt surfaces. They cannot subsequently be cured to give coatings having acceptable surfaces.

What is claimed as new and desired to be secured by letters patent of the United States is:

1. A one-component aqueous coating system, consisting essentially of:
   (A) a hydrophilic polyurethane containing at least one hydroxyl group,
   (B) a melamine resin,
   (C) optionally a pigment of a conventional paint auxiliary,
   (D) a reactive additive component in an amount of from 2 to 20% by weight, based on the overall solids content of (A), (B) and (D), said additive component (D) being a polyether polyol which is reactive to component (B), said component (D) having a solubility in water of below 2% by weight and a molecular weight of 500–2000 g/mol; and
   water.

2. The coating system of claim 1, wherein said reactive additive polyether polyol (D) is polytetramethylene glycol.

3. The coating system of claim 1, wherein said aqueous system is present as a suspension, dispersion, emulsion or solution.

4. The coating system of claim 1, wherein said auxiliary is an antifoam, a leveling agent, a catalyst or a thixotropic agent.

5. A process for the preparation of a one-component aqueous coating system consisting essentially of:
   (A) a hydrophilic polyurethane containing at least one hydroxyl group,
   (B) a melamine resin,
   (C) optionally, a pigment or a conventional paint auxiliary,
   wherein a mixture is obtained by mixing said components (A) to (C) and a further reactive additive component (D) which is a polyether polyol, said polyether polyol being present in a quantity of from 2 to 20% by weight, based on the overall solids content of said (A), (B) and (D), having a solubility in water of below 2% by weight and a molecular weight of 500–2000 g/mol,
   and wherein said mixture is subsequently converted into an aqueous system.

6. The process of claim 5, wherein (A), (B), optionally (C) and (D) are mixed in an organic solvent.

7. The process of claim 5, wherein said auxiliary is an antifoam, a leveling agent, a catalyst or a thixotropic agent.

8. The process of claim 5, wherein said reactive additive polyether polyol (D) is polytetramethylene glycol.

* * * * *